L. PETTIT.
SPRING PACKING PISTON HEAD.
APPLICATION FILED AUG. 18, 1910.
993,458.
Patented May 30, 1911.
2 SHEETS—SHEET 1.
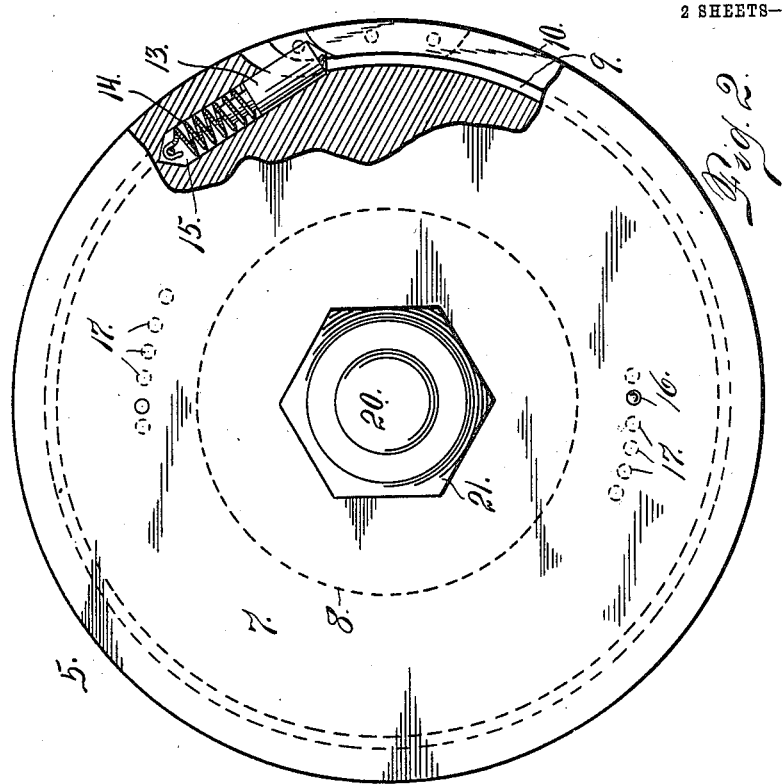
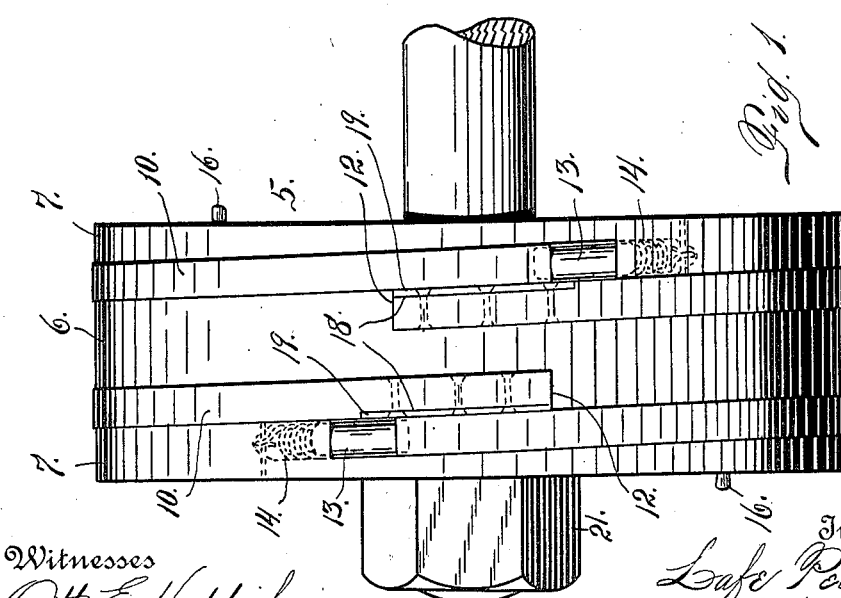
Witnesses
Otto E. Hoddick
C. H. Roessner.
Inventor
Lafe Pettit
By A. J. O'Brien.
Attorney

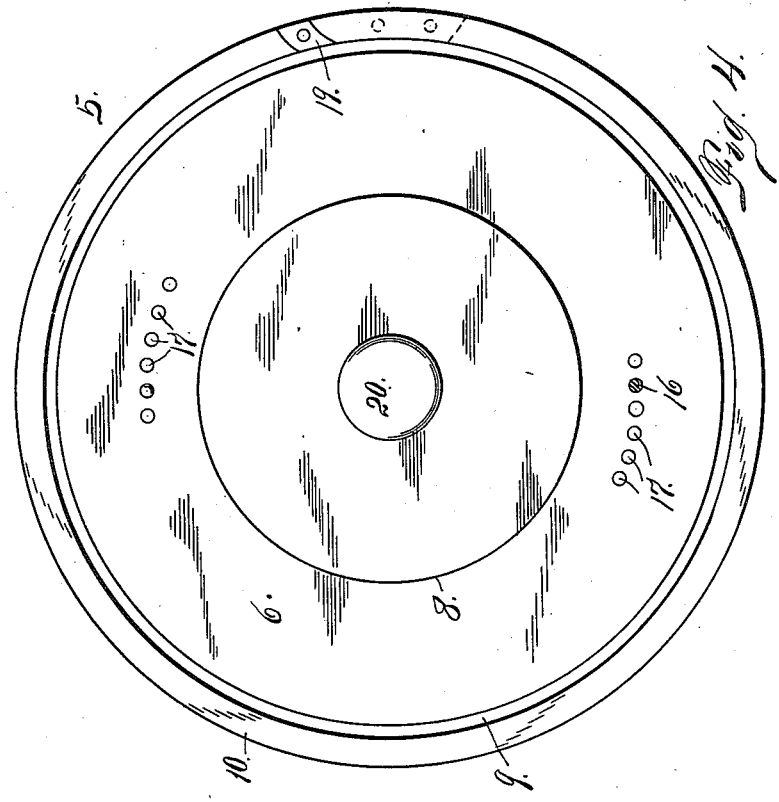
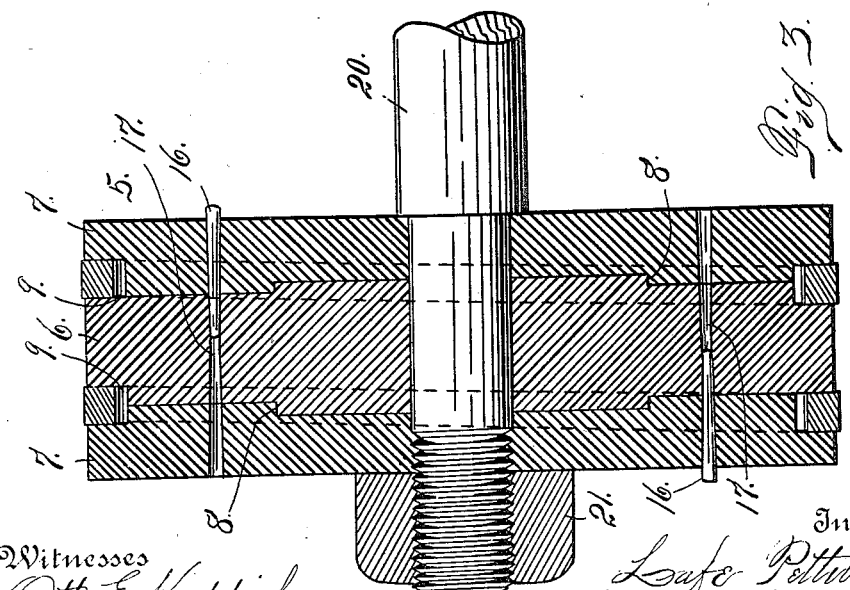

UNITED STATES PATENT OFFICE.

LAFE PETTIT, OF VICTOR, COLORADO.

SPRING-PACKING PISTON-HEAD.

993,458. Specification of Letters Patent. Patented May 30, 1911.

Application filed August 18, 1910. Serial No. 577,804.

*To all whom it may concern:*

Be it known that I, LAFE PETTIT, a citizen of the United States, residing at Victor, county of Teller, and State of Colorado, have invented certain new and useful Improvements in Spring-Packing Piston-Heads; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in piston heads, the improvement relating more particularly to the packing therefor.

The piston head is composed of a plurality of members which are interlocked by circumferentially formed engaging shoulders, one member being recessed, and the other reinforced and of counterpart shape, whereby the members may be turned upon each other, the shoulders constituting the joints forming guides whereby the members are accurately retained in place.

In the construction illustrated in the drawing the piston head is composed of three members consisting of disks or circular plates connected by dowel pins. Two packing rings are located in spirally arranged slots, each slot being formed partly in one of the outer disks and partly in the central or inner member of the piston, the rings being normally arranged so as to overlap a considerable distance. At one extremity of each packing ring is located a spring-actuated pawl or dog which engages the end of the ring and yieldingly maintains it in place. It may be assumed that originally each packing ring completely fills in depth the spiral groove in which it is located. However, as the ring wears it expands by virtue of its own tension, in order that it may properly perform the packing function in the cylinder. This action of the ring shortens it and the spring-actuated pawl acting on one of its ends holds the other end against an abrupt wall formed at one end of the slot in which the ring is located. The disk in which the spring-actuated pawl is located is circularly or rotatably adjustable to maintain the spring acting on the pawl under sufficient tension for the purpose. After the disk or piston plate has been adjusted sufficiently for the aforesaid purpose, it is secured in the adjusted position by means of a dowel pin, which previous to adjusting the piston disk must of course be removed.

Of course where the piston or piston head is composed of three plates or disks, that is to say, a central disk and two outer disks, the outer disks are adjusted upon the inner disk, the latter, however, being provided with a number of openings for the reception of the dowel pins. Hence after each adjustment as aforesaid the dowel pin will be inserted in a different opening in the central disk of the piston head. In this manner the packing rings, by virtue of their own expansion, may be utilized until they are practically worn out.

Having briefly outlined my improved construction, I will proceed to describe the same in detail, reference being made to the accompanying drawing in which is illustrated an embodiment thereof.

In this drawing: Figure 1 is an elevation of a piston head constructed after the manner of my invention. Fig. 2 is an end elevation of the same partly broken away and sectionized to disclose the spring-actuated pawl and the manner in which it acts upon a packing ring. Fig. 3 is a section taken through my improved piston head. Fig. 4 is an end view of the piston head with one of the outer disks removed, the packing ring, however, being shown in elevation.

The same reference characters indicate the same parts in all the views.

Let the numeral 5 designate a piston head which is composed of a central disk 6 and two outer disks 7. Where the disk 6 joins or engages the disks 7, the engaging parts are provided with circular male and female shoulders constituting guides when the outer disks are adjusted upon the central disk. These engaging shoulders are indicated at 8. As shown in the drawing the central portion of the middle member 6 is reinforced, its outer portion being cut away, while the outer disks are centrally recessed and their outer portions reinforced to the same extent, whereby the adjacent faces of the engaging disk members of the piston head are counterpart in shape.

As illustrated in the drawing the piston head is provided with two spirally arranged grooves 9 which are formed partly in the disks 7 and partly in the disk 6. Each groove extends into the center member 6 and the grooves are so arranged that their extremities, so to speak, overlap or extend past each other, this portion of the groove therefore being made of double width. In each of these grooves is located a packing ring 10, one extremity of which abuts against an abrupt wall 12 in one end of the groove, while its opposite end engages a pawl or dog 13 acted upon by a spiral spring 14, the spring being located in a recess 15 formed in the body of the piston plate or disk 7. Originally, or when the packing rings are new, it may be assumed that they practically fill the entire depth of the grooves 9, and at the same time properly perform the packing function or cause the piston to form a fluid-tight joint with the inner surface of the cylinder. However, after the piston rings have become worn away circumferentially and expand by virtue of their own tension to engage constantly the inner wall of the cylinder, the plates or disks 7 may be adjusted by turning them in such a direction as to compress the springs 14 and cause the latter to act upon the pawls 13, which in turn engage one extremity of each packing ring, and cause the other extremity to closely engage the wall 12, thus compensating for the shortening of the spring rings due to their expansion as aforesaid. This adjustment may be performed as often as necessary, or until the packing rings are practically worn out. In order to make this adjustment practicable, I connect the members of the piston head by the use of dowel pins 16, each of which is inserted in an opening formed transversely through one of the members 7, the said pins being adapted to enter any one of a series of openings 17 formed in the central member 6, the number of the openings 17 being sufficient to permit the required degree of adjustment during the life of the packing rings. Of course in order to adjust the packing rings, it is necessary to first remove or withdraw the dowel pins from the central member 6, after which the disks are turned in the manner heretofore described until the springs 14 are placed under sufficient tension, after which the dowel pins are forced into the openings 17, which are in alinement with the dowel pins when the disks 7 are properly arranged to give the necessary tension to the said springs. Where the extremities of each packing ring overlap, one of the rings is cut away as shown at 18, the cut away portion being replaced by a plate 19. In the drawing the piston head in Figs. 1, 2 and 3 is shown mounted upon a stem 20 and secured in place by a nut 21 threaded on the stem.

From the foregoing description it will be understood that the packing rings when first placed in the grooves of the piston head, fill said grooves and engage the wall of the cylinder with sufficient force to properly perform the packing function; also that as the rings wear due to the regular use of the piston head within the cylinder, the rings automatically expand by virtue of their own tension, and therefore maintain their packing relation with the inner surface of the cylinder. During this expansion the extremities of the springs have a tendency to move away from the parts which they engage, one extremity of each spring having a tendency to move away from its engaging wall 12, while the other extremity has a tendency to move away from its engaging spring-actuated pawl 13. However, the disks 7 are properly adjusted from time to time to give the coil springs acting on the pawls 13 sufficient tension to cause the pawls acting on one extremity of each spring to hold the opposite extremities of the springs against the walls 12, thus compensating for the shortening of the spring rings due to their expansion incident to the wear upon the rings during use.

Having thus described my invention, what I claim is:

1. A piston head composed of a plurality of members, the head having a spiral groove formed partly in each of two adjacent members, the extremities of the groove overlapping a spring packing ring inserted in the groove and having overlapping extremities, one extremity of the packing ring normally engaging the wall at one end of the groove, a spring-actuated pawl or dog carried by one member and acting upon the opposite extremity of the packing ring, so that when one of the members is turned to place the spring of the pawl under tension, the latter acts upon the packing ring, to hold its opposite extremity against the wall at the adjacent end of the groove, and means for securing the piston head members in the adjusted position, substantially as described.

2. A piston head composed of a plurality of plates or disks, the adjacent surfaces of any two plates having circularly arranged engaging shoulders, a spiral groove formed partly in one member and partly in the adjacent member of the head, the extremities of the groove passing or overlapping each other, a packing ring inserted in the groove and having one extremity in engagement with the adjacent end wall of the groove, and a spring-actuated dog carried by one member and acting upon the other extremity of the packing ring so that by the circular movement of one member of the piston, the spring acting on the dog may be compressed to maintain the opposite extremity of the ring against the adjacent wall of the groove, thus compensating for the shortening of the ring due to expansion, substantially as described.

3. A piston head composed of a plurality of disks or plates, the adjacent surfaces of any two disks having interlocking counterpart shoulders circularly arranged, dowel pins inserted in openings formed in the outer members of the piston head and adapted to enter any one of a series of openings formed in the central member, the piston head having spiral grooves formed partly in each end member and partly in the central member of the head, the extremities of each groove overlapping, packing rings inserted in the grooves, and means acting on one extremity of each packing ring for constantly holding its opposite extremity against the adjacent wall of the groove, thus compensating for the tendency of said ring extremity to move away from the said wall during the expansion of the ring, substantially as described.

4. A piston head having a central member and a member located on each side of the central member, the adjacent surfaces of the different members of the head having circularly arranged counterpart shoulders, each outer member having an opening, a dowel pin inserted therein and adapted to engage any one of a series of openings formed in the central member, the piston having spiral grooves formed respectively in the end members of the piston, and extending into the central member, packing rings inserted in these grooves, and a spring-actuated dog or pawl carried by each of the end members of the head and acting upon one end of each packing ring to maintain its opposite end against the adjacent end wall of the groove, thus compensating for the tendency of the said packing ring end to move away from the said wall during the expansion of the ring incident to wear, substantially as described.

5. A piston head composed of a plurality of interlocking members, spiral grooves formed in the head partly in each of two adjacent members, the extremities of the grooves passing beyond each other, a packing ring inserted in each groove, and means located in one member of the head and engaging one end of the packing ring, to hold its opposite end against the adjacent end wall of the groove, thus compensating for the tendency of said packing ring end to move away from the said wall during use, substantially as described.

In testimony whereof I affix my signature in presence of two witnesses.

LAFE PETTIT.

Witnesses:
 Gus Winters,
 Chas. Schiffbauer.